United States Patent
Deng et al.

(10) Patent No.: US 7,688,531 B1
(45) Date of Patent: Mar. 30, 2010

(54) MINIATURE IMAGE CAPTURE LENS

(75) Inventors: Jau-Jan Deng, Taipei (TW);
Wei-Chung Chang, Taoyuan (TW);
Min-Chih Liao, Taipei (TW)

(73) Assignee: VisEra Technologies Company, Limited, Hsinchu (TW)

( * ) Notice: Subject to any disclaimer, the term of this patent is extended or adjusted under 35 U.S.C. 154(b) by 0 days.

(21) Appl. No.: 12/248,723

(22) Filed: Oct. 9, 2008

(51) Int. Cl.
*G02B 7/02* (2006.01)
*G02B 9/34* (2006.01)

(52) U.S. Cl. ...................................... 359/811; 359/772
(58) Field of Classification Search ......... 359/694–700, 359/811–823, 771, 772, 755; 348/207.2, 348/222.1, 374
See application file for complete search history.

(56) References Cited

U.S. PATENT DOCUMENTS

| 6,437,926 B2 * | 8/2002 | Mori ........................... 359/755 |
| 7,345,830 B2 * | 3/2008 | Shinohara .................... 359/772 |

* cited by examiner

*Primary Examiner*—Mohammed Hasan
(74) *Attorney, Agent, or Firm*—Muncy, Geissler, Olds & Lowe, PLLC (57) ABSTRACT

A miniature image capture lens is disclosed comprising an aperture diaphragm having an aperture through which an image is captured and a wafer-level lens system, including a first surface disposed on a first substrate, a second substrate with a first side bonded to the first substrate, a second surface disposed on a second side of the second substrate, and a third surface disposed on a third substrate, wherein the first surface, the second surface and the third surface are aspherical and the following conditions are satisfied: $L/f_e$ i.7, $f_1$~/fe=0.5–1.5, $f_2/f_e$=–1--1.5; and $-2 < f_3/f_e < 2$, wherein L total track length (TTL) from the first surface to an image plane, fe: effective focal length of whole lens system, $f_1$ effective focal length of the first surface, $f_2$ effective focal length of the second surface and $f_3$ effective focal length of the third surface.

20 Claims, 14 Drawing Sheets

MINIATURE IMAGE CAPTURE LENS

BACKGROUND OF THE INVENTION

1. Field of the Invention

This invention relates to a lens system, and more particularly relates to a wafer-level miniature image capture lens.

2. Description of the Related Art

Mobile phones or personal computers employing imaging devices have become popular due to employment of solid-state image capture elements such as a CCD (a charged coupled device) type image sensors, a CMOS (a complementary metal oxide semiconductor) type image sensors and the like, allowing for higher performance and miniaturization of imaging devices. Additionally, there is demand for further miniaturization of image capture lenses loaded on the imaging devices.

However, despite demands, limits for further miniaturization of image capture lenses are being reached, as for the conventional image capture lenses, because they are true three dimensional (3-D) structures and sensors therein need to also be miniaturized, it is difficult to control accuracy of lateral shift and tilt for each lens surface nor to handle tiny lens during fabrication. Namely, tolerance is less.

Figure 1:
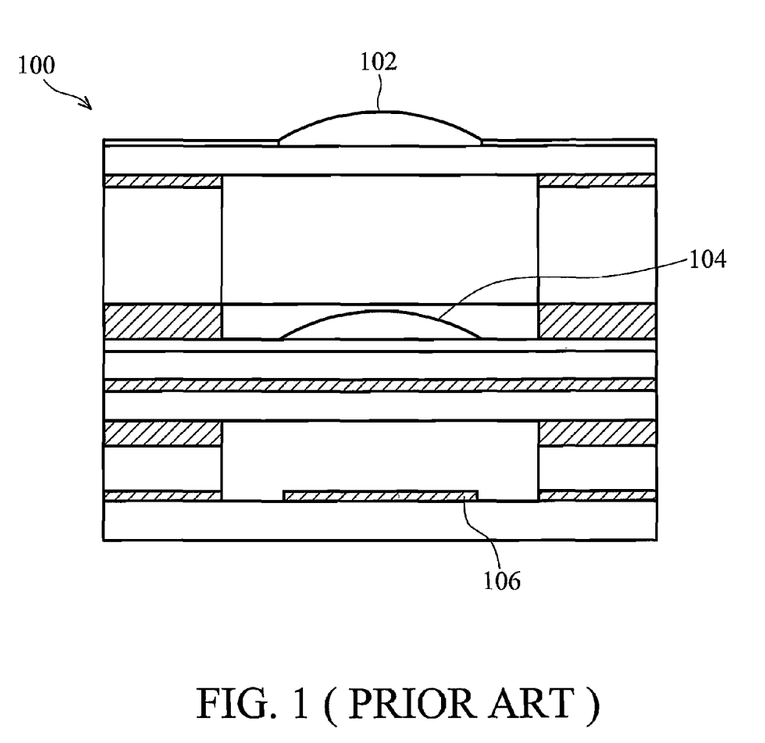
FIG. 1 shows an imaging device using a conventional wafer-level lens module system.

FIG. 1 shows an imaging device using a published wafer-level lens module system. Light passes through the wafer-level lens 102 and 104 to the sensing element 106. In this art, the wafer-level lens modules 102 and 104 and the sensing element 106 can be fabricated by VLSI process technologies. Therefore, the image device 100 can have a smaller size suitable for portable electronic devices, such as cell phones or personal digital assistants (PDAs). The wafer-level lens converts the true 3-Dimensional structure into a 2.5-Dimensional structure which stacks each lens plate into a lens cube. Thus, allowing for further miniaturization along with technological advances driven by semiconductor processes such as Moore's law, as tolerance is greater. Moreover, while conventional lenses are fabricated by a discrete process, which assembles the lenses one by one, in contrast, the wafer-level lens is fabricated by a batch process, which can stack thousands of lens on a lens plate into a lens module array, then singulate into a lens cube by die-saw process. However, despite the smaller volume, conventional 3-D lens currently outperform wafer-level lenses. Additionally, it is relatively more difficult to design a optical lens system with small enough aberration, good enough modulation transfer function (MTF), for wafer-level lenses, especially when Nyquist frequency is higher, than for conventional three dimensional (3-D) lenses. While MTF may be increased for wafer-level lenses by increasing the lens surface number, the lens total track would correspondingly increase in length.

BRIEF SUMMARY OF INVENTION

Thus, in reference to the negative issues previously described, the invention provides a wafer-level lens system which has only 3 optical surfaces, is able to achieve a good MTF and an ultra short total track.

An embodiment of the invention discloses a miniature image capture lens, comprising an aperture diaphragm having an aperture through which an image is captured and a wafer-level lens system, including a first surface disposed on a first substrate, a second substrate with a first side bonded to the first substrate, a second surface disposed on a second side of the second substrate, and a third surface disposed on a third substrate, wherein the first surface, the second surface and the third surface are aspherical and the following conditions are satisfied:

$L/f_e < 1.7;$ $f_1/f_e = 0.5 \sim 1.5;$ $f_2/f_e = -1 \sim -1.5;$ and $-2 < f_3/f_e < 2,$ wherein L: total track length (TTL) from the first surface to an image plane,
$f_e$: effective focal length of whole lens system,
$f_1$: effective focal length of the first surface,
$f_2$: effective focal length of the second surface, and
$f_3$: effective focal length of the third surface.

Another embodiment of the invention discloses a miniature image capture lens, comprising an aperture diaphragm having an aperture through which an image is captured and a wafer-level lens system, including a first surface disposed on a first side of a first substrate, a second surface disposed a second side of the first substrate, a third surface disposed on a second substrate; wherein the first surface, the second surface and the third surface are aspherical and the following conditions are satisfied:

$L/f_e < 1.7;$ $f_1/f_e = 0.5 \sim 1.5;$ $f_2/f_e = -1 \sim -1.5;$ and $-2 < f_3/f_e < 2,$ wherein L: total track length (TTL) from the first surface to an image plane,
$f_e$: effective focal length of whole lens system
$f_1$: effective focal length of the first surface,
$f_2$: effective focal length of the second surface, and
$f_3$: effective focal length of the third surface.

BRIEF DESCRIPTION OF DRAWINGS

The invention can be more fully understood by reading the subsequent detailed description and examples with references made to the accompanying drawings, wherein.

DETAILED DESCRIPTION OF INVENTION

The following descriptions are of the contemplated mode of carrying out the invention. This descriptions are made for the purpose of illustrating the general principles of the invention and should not be taken in a limiting sense, not for limiting the invention.

Figure 2:
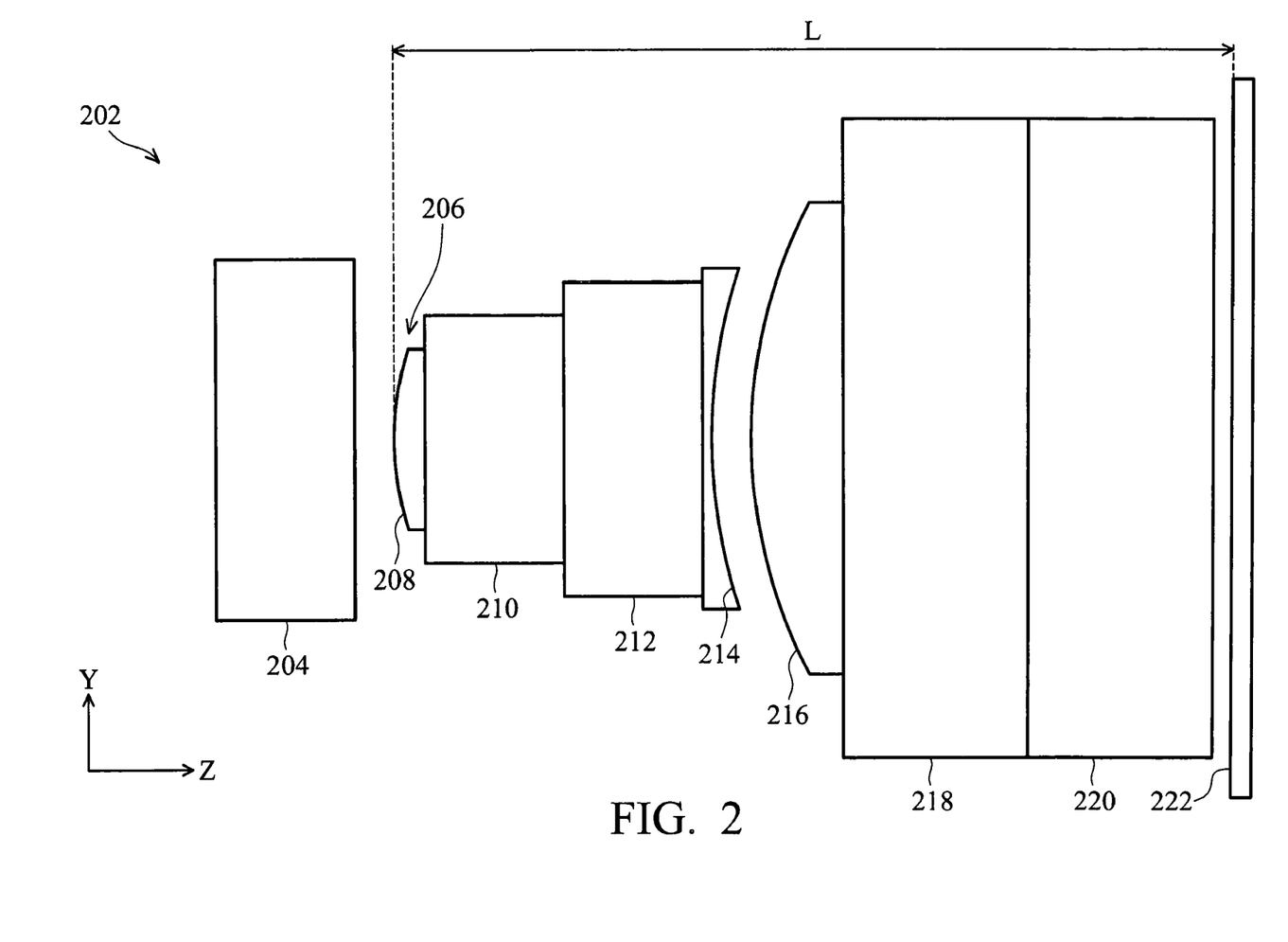
FIG. 2 shows a cross section view of a miniature image capture lens of an embodiment of the invention.

FIG. 2 shows a cross section view (y-z plane view) of a miniature image capture lens of an embodiment of the invention. This miniature image capture lens 202 can capture an image of an object (not shown), and the following paragraph describes the miniature image capture lens 202 from the outside to the image plane (or sensor). First, a front cover glass 204 which can be coated with UV/IR cut filter is provided. Next, a diaphragm 206 and a first lens 208 (positive) are disposed on a first substrate 210. A second substrate 212 is bonded to the first substrate 210 at a first side. A second lens 214 (negative) is disposed on a second side of the second substrate 212. A third lens 216 (positive) is disposed on a third substrate 218. The third substrate 218 is bonded to a back cover glass 220. In the embodiment, the first lens 208 and the second lens 214 is cemented as a meniscus-like lens and the third lens 216 is a field corrector which corrects chief ray angle to match the image sensor.

Figure 3:
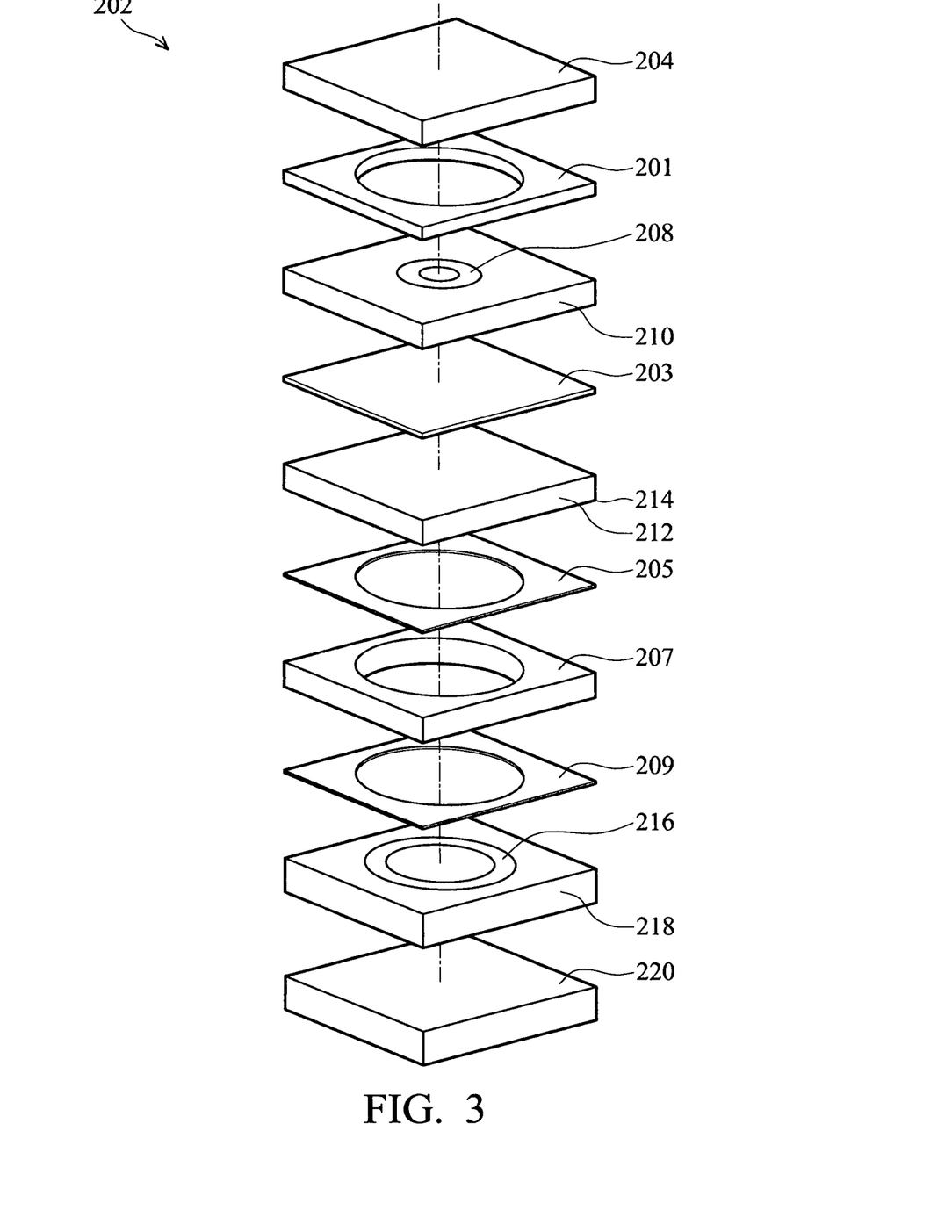
FIG. 3 shows an exploded view of the miniature image capture lens of an embodiment of the invention.
Figure 4:
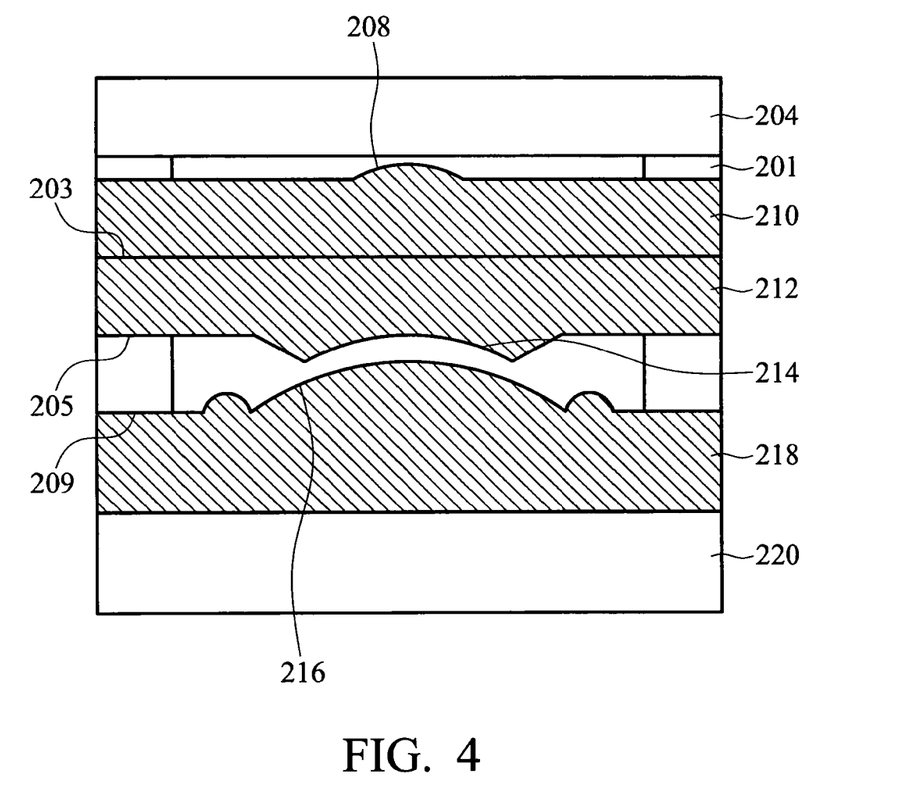
FIG. 4 shows a cross section of the miniature image capture lens of an embodiment of the invention.

The miniature image capture lens of the embodiment of FIG. 2 of the invention is described in more detail in accordance with FIG. 3 and FIG. 4, which shows an exploded view and a cross section the miniature image capture lens. Referring to FIG. 3 and FIG. 4, the miniature image capture lens 202 comprises a front cover glass 204, a spacer dam 201, a first lens 208 on a first substrate 210, a first glue 203, a second lens 214 below a second substrate 212, a second glue 205, a spacer 207, a third glue 209, a third lens 216 on a third substrate 218 and a back cover glass 220 from the top side to the bottom side.

Specifically, the first lens 208, the second lens 214 and the third lens 216 are aspherical and the following conditions are satisfied:

$L/f_e < 1.7;$ $f_1/f_e = 0.5 \sim 1.5;$ $f_2/f_e = -1 \sim -1.5;$ and $-2 < f_3/f_e < 2,$ wherein L: total track length (TTL) from the first lens to the image plane, $f_e$: effective focal length of whole lens system, $f_1$: effective focal length of the first lens, $f_2$: effective focal length of the second lens, and $f_3$: effective focal length of the third lens, and wherein $$\frac{1}{f_l} \cong (n_l - 1)\left(\frac{1}{R_l} - \frac{1}{R_{l+1}}\right),$$

wherein n: refraction index, and

R: radius if curvature of optical surface.

In the embodiment, the first substrate 210, the second substrate 212 and the third substrate 218 can be glass plates which match the index of refraction of lens material and have thicknesses of about 300 μm~400 μm. The spacer 201 and 207 can be frosted glass or black high intensity plastic with drilled holes. A UV/IR cut filter and a diaphragm can be formed in a separated glass substrate, for example formed on the front cover glass 204, or integrated on the surface of first lens 208. The third lens 216 is for correction of chief ray angle incident onto sensor. In this embodiment, if maximum chief ray angle (CRA) is allowed to be 27 degree, the total track can be as low as 1.55 times focal length. If maximum CRA is allowed to 35 degree, such as a CCD sensor or BSI CMOS sensor, the total track can be as low as 1.4 times focal length.

In each example, the shape of the aspherical surface is shown by expression 1, in a perpendicular coordinate system, with the vertex of the surface being the origin, and the optical axial direction being the z-axis, as follows:

$$\text{expression 1:} z = \frac{CR^2}{1 + \sqrt{1 - (1+K)r^2/R^2}} + \sum_{i=2}^{i=20} A_i r^i,$$

wherein

C: vertex curvature,

K: Conic constant, and $A_i$: i-th order aspherical coefficients, wherein $r = \sqrt{x^2 + y^2}$.

Parameters of example 1 are illustrated in this paragraph, and they are as follows:

$f_e = 1.137$ mm;

$L = 1.76$ mm;

$R_1 = 0.703$ mm; $R_2 = 0.745$ mm; $R_3 = 0.55$ mm;

$f_1/f_e = 1.357/1.137 = 1.19;$ $f_2/f_e = -1.438/1.137 = -1.26;$ and $f_3/f_e = 1.06/1.137 = 0.93.$ The surface data of each lens is illustrated in table 1.

TABLE 1

| | Design Curve | | |
| --- | --- | --- | --- |
| | 1st Lens | 2nd Lens | 3rd Lens |
| C | 1.4101 | 1.3427 | 1.8182 |
| Thickness | 0.0505 | 0.08786 | 0.2021 |
| Clear Aperture | 0.1970 | 0.37837 | 0.5659 |
| K | 1.6194 | −33.3073 | −9.5269 |
| A2 | 0.000000 | 0.000000 | 0.000000 |
| A4 | −0.44356 | 0.61053 | −0.02817 |
| A6 | 8.99370 | 0.61548 | 1.71033 |
| A8 | −610.78284 | 34.43672 | −4.45679 |
| A10 | 7489.33330 | −140.74006 | 4.17470 |

Figure 5A:
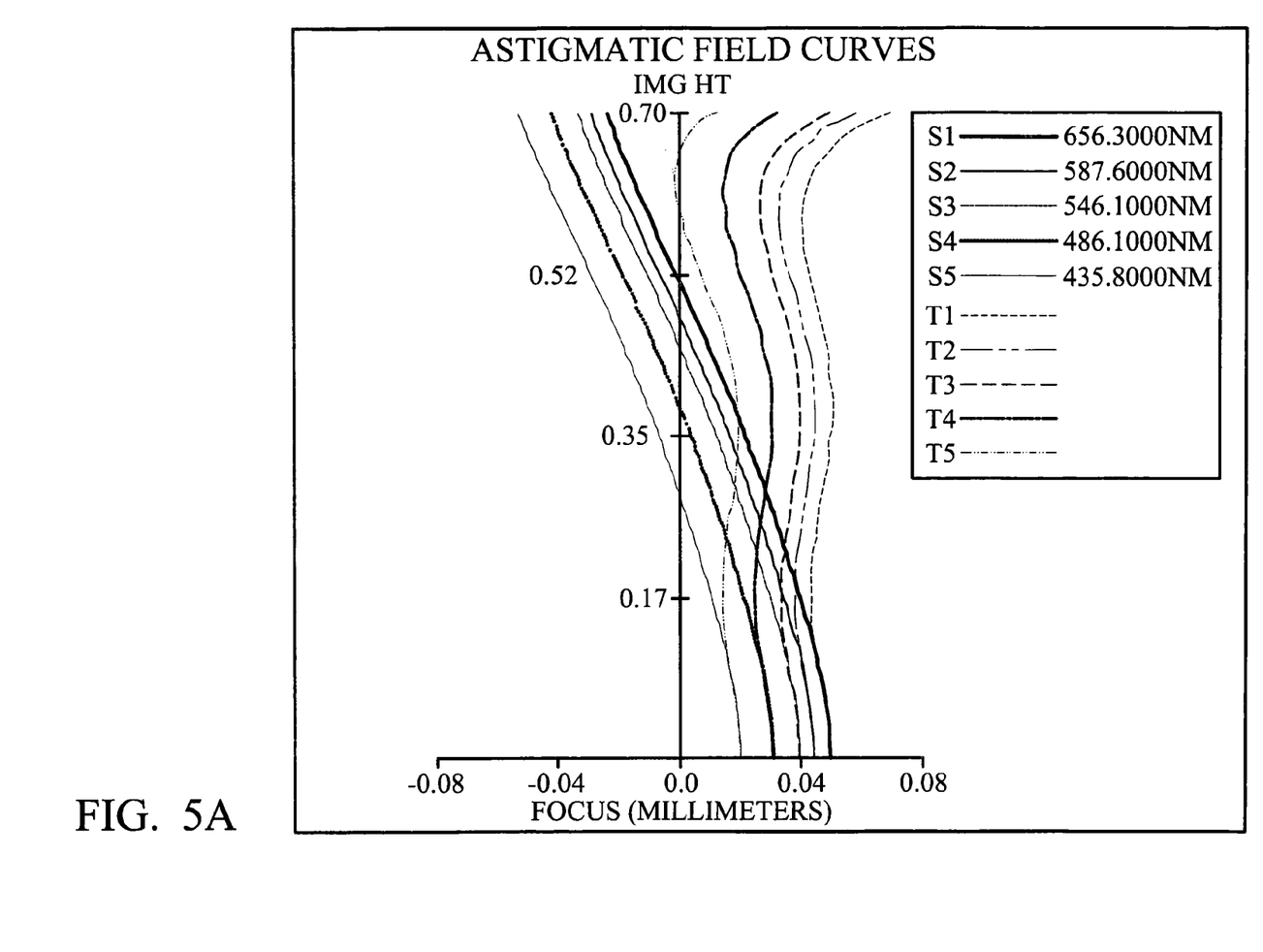
FIG. 5A shows a drawing of astigmatic field curves under various wave length conditions of an example of the invention.
Figure 5B:
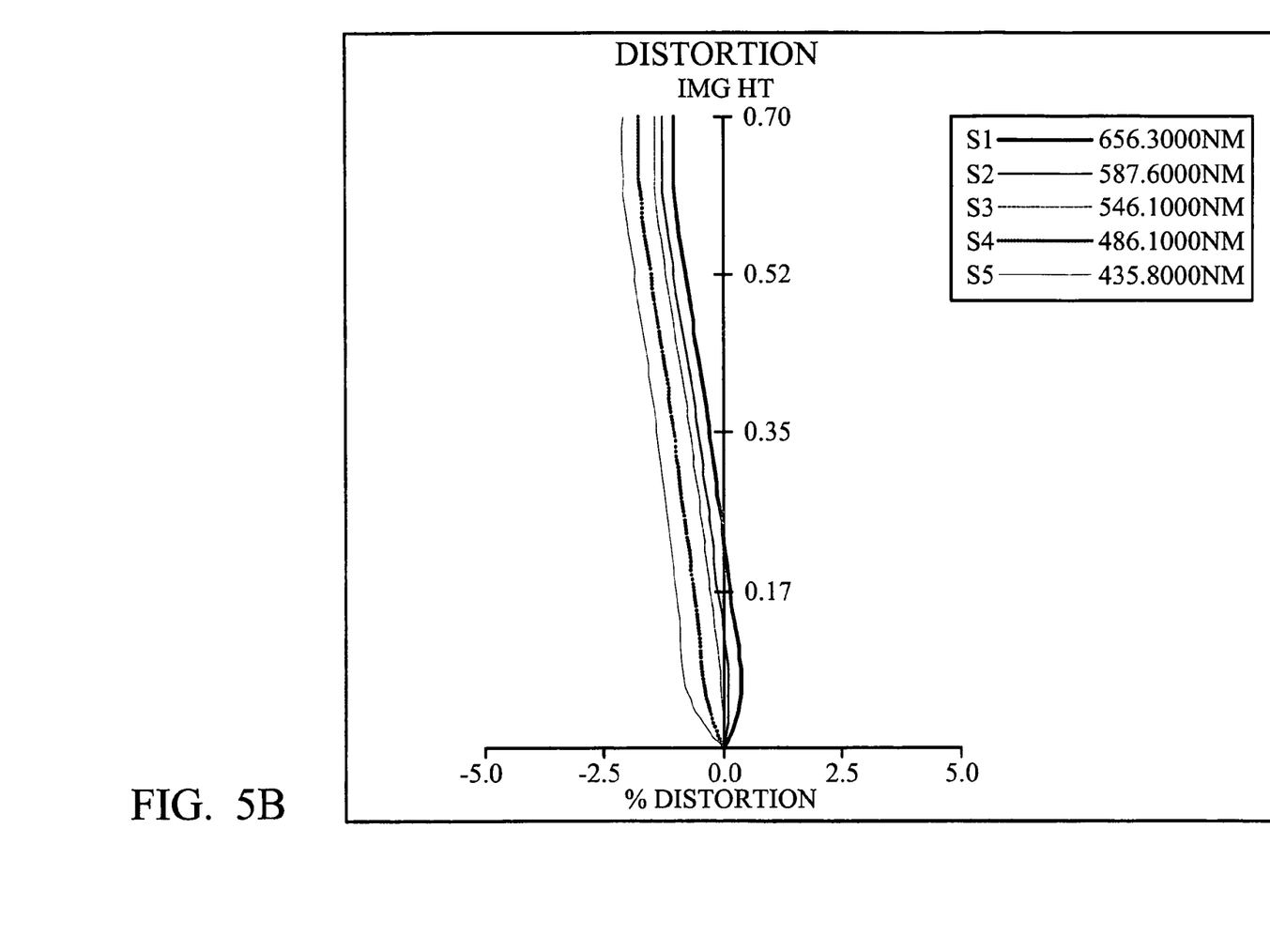
FIG. 5B shows a drawing of distortion curves under various wave length conditions of an example of the invention.
Figure 5C:
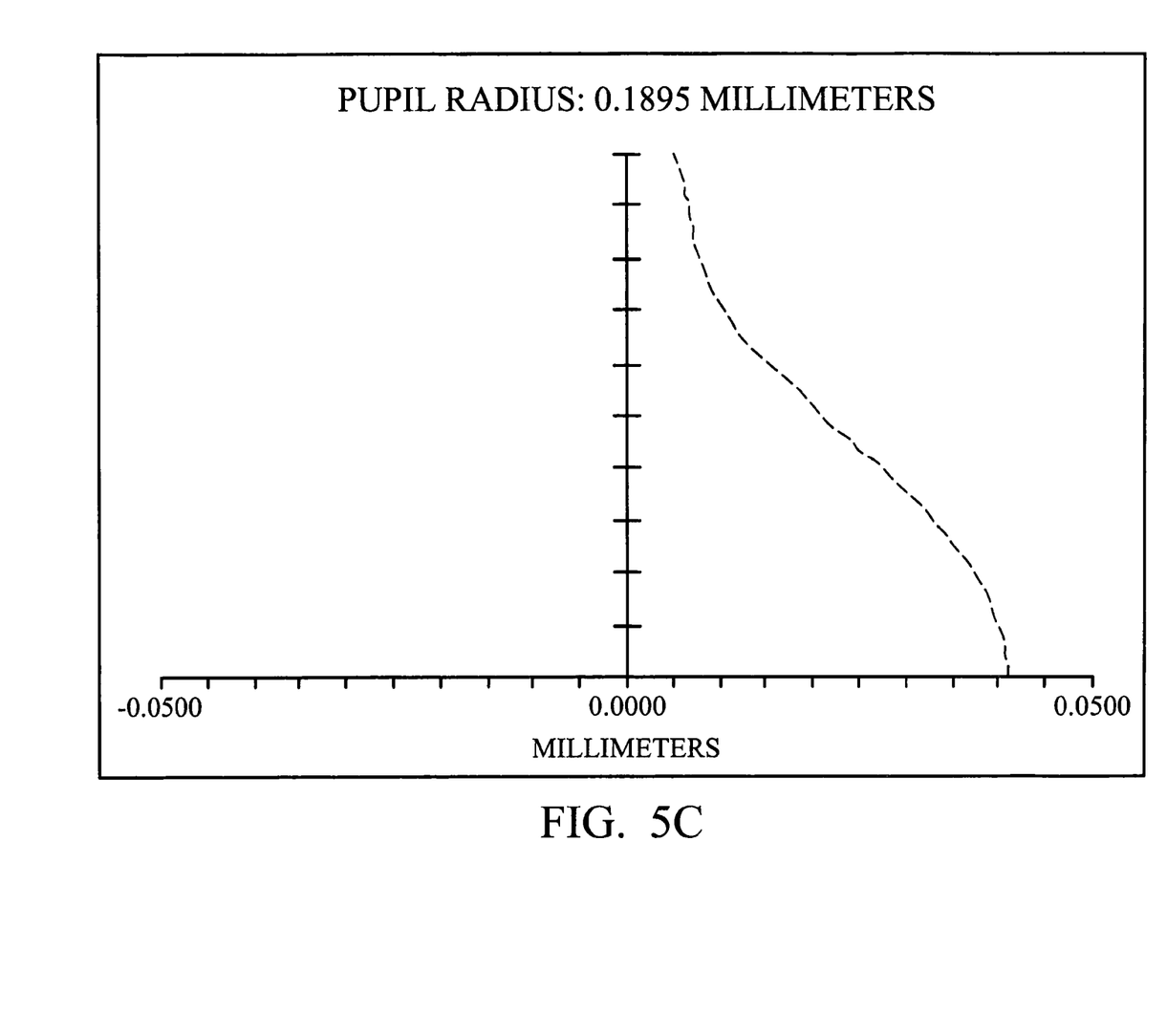
FIG. 5C shows a drawing of a spherical aberration of an example of the invention.
Figure 5D:
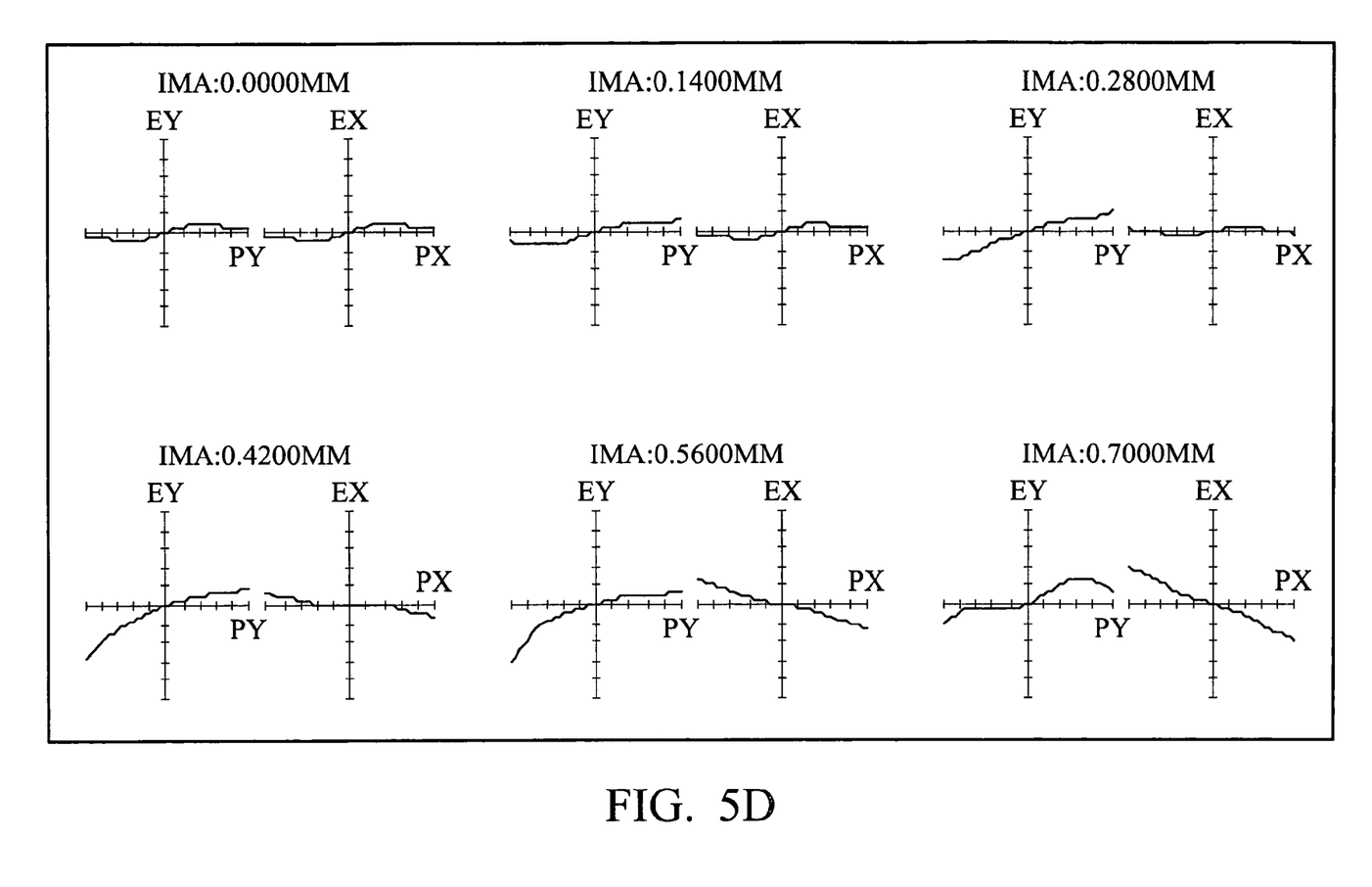
FIG. 5D shows a drawing of a coma aberration of an example of the invention.
Figure 6:
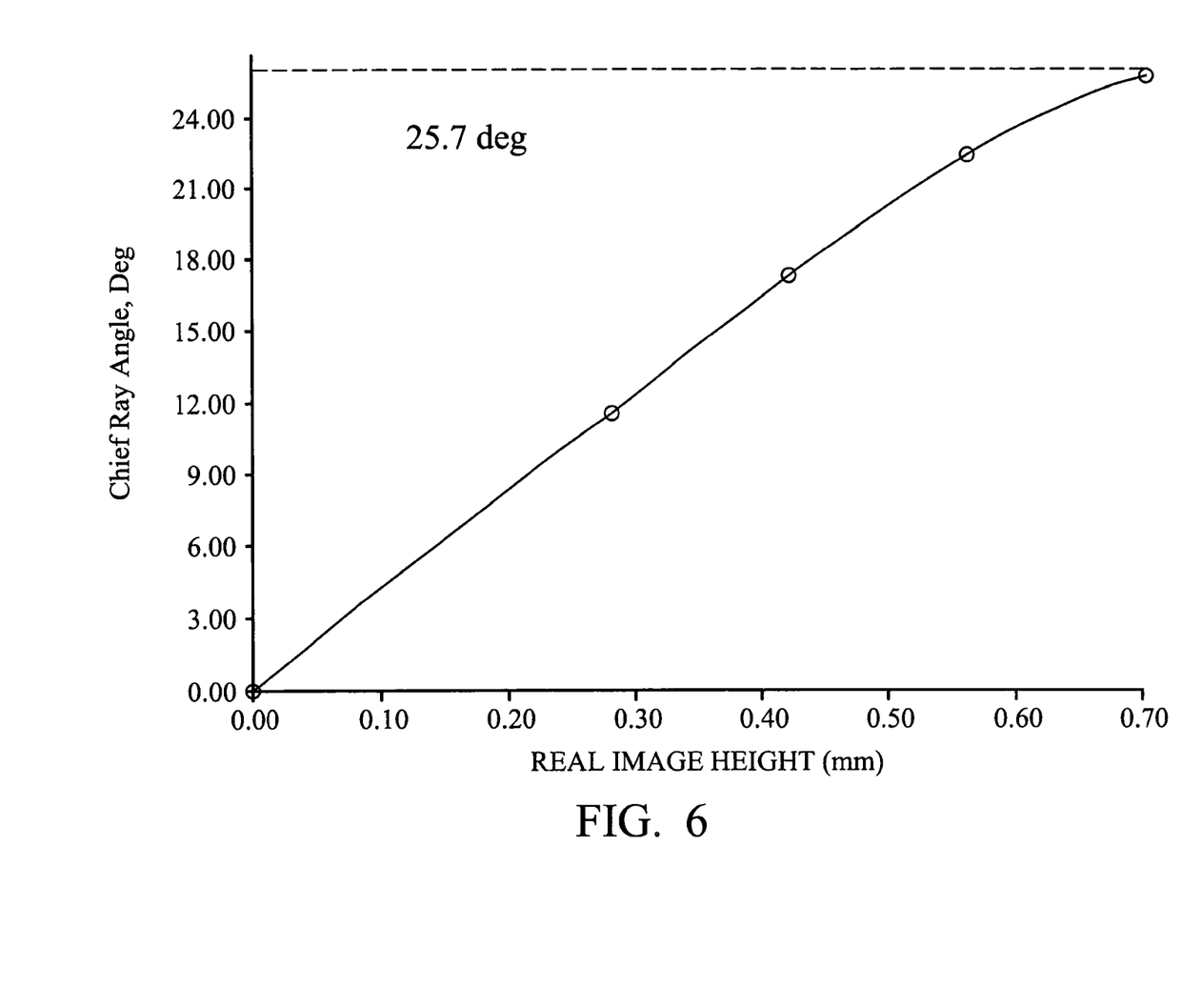
FIG. 6 shows a drawing of a CRA as a function of real image height of an example of the invention.

FIG. 5A shows a drawing of astigmatic field curves under various wave length conditions of the example, in which the lines S1~S5 shows sagittal lines and the lines T1~T5 show tangential lines. As shown in FIG. 5A, the present example can present an astigmatic aberration of substantially less than 0.06 mm. FIG. 5B shows a drawing of distortion curves under various wave length conditions of the example. FIG. 5C shows a drawing of a spherical aberration of the example. FIG. 5D shows a drawing of a coma aberration of the example. According to FIGS. 5A~5D, the miniature image capture lens of the embodiment can have good aberration performance. FIG. 6 shows a drawing of a CRA as a function of real image height and a linear performance is obtained.

Figure 7:
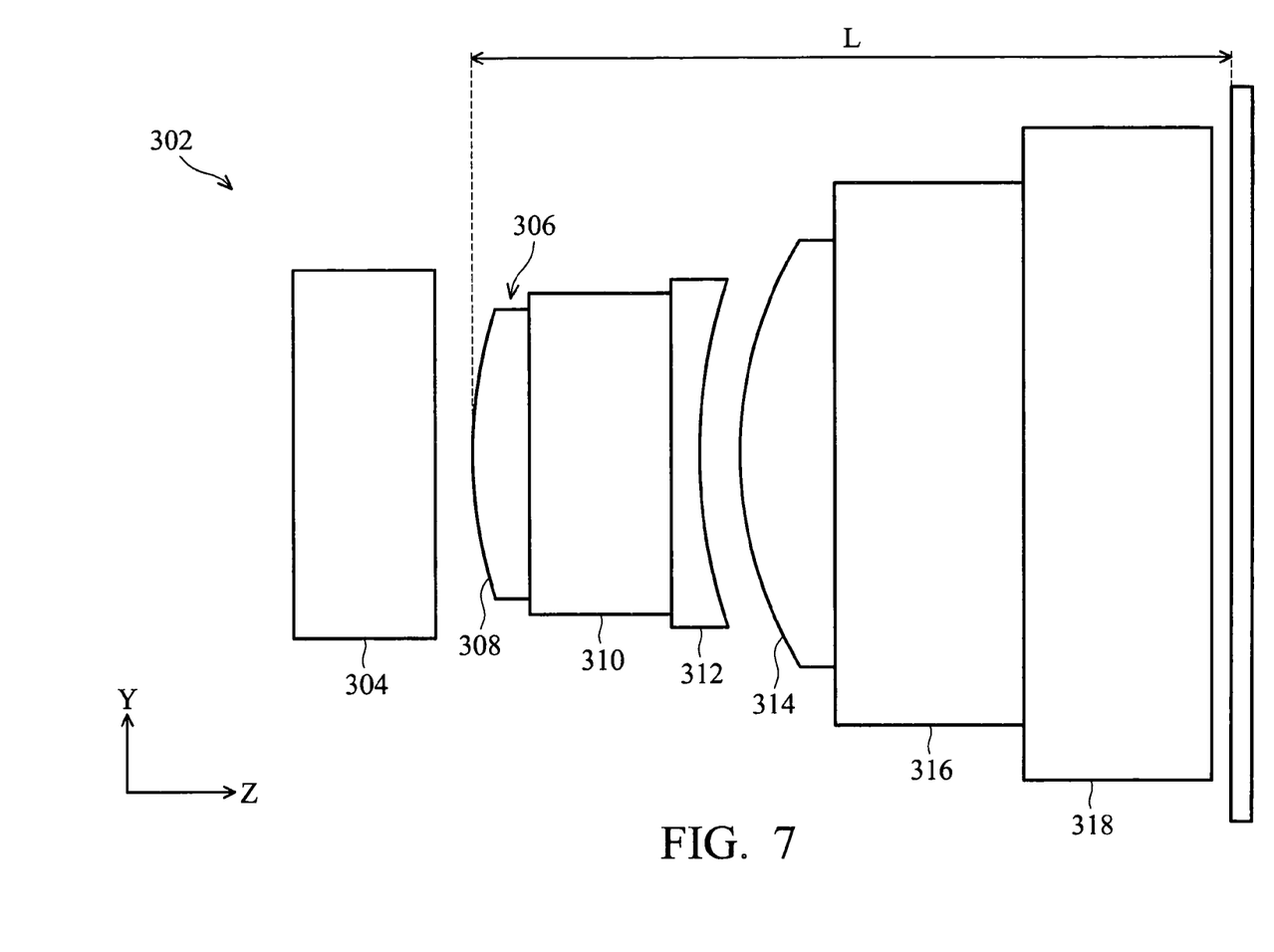
FIG. 7 shows a cross section view of a miniature image capture lens of another embodiment of the invention.

FIG. 7 shows a cross section view (y-z plane view) of a miniature image capture lens of another embodiment of the invention. Unlike the embodiment of FIG. 2, wherein the first lens 208 is combined with the first substrate 210 to form a single-side lens and the second lens 214 is combined with the second substrate 212 to form a single-side lens, the first and second lenses 308, 312 of the embodiment of FIG. 7 is combined with only one substrate to form a double-side lens. In more detail, the miniature image capture lens 302 comprises a front cover glass 304 which can be coated with a UV/IR cut filter. A diaphragm 306 and a first lens 308 (positive) are disposed on a first side of a first substrate 310 and a second lens 312 (negative) is disposed a second side of the first substrate 310. A third lens 314 (positive) is disposed on a second substrate 316. The second substrate 316 is bonded to a back cover glass 318. In the embodiment, the first lens 308 and the second lens 312 is cemented as a meniscus-like lens and the third lens 314 is a field corrector which corrects chief ray angle to match the image sensor. Specifically, the first lens 308, the second lens 312 and the third lens 314 are aspherical and the following conditions are also satisfied:

$L/f_e < 1.7$;

$f_1/f_e = 0.5 \sim 1.5$;

$f_2/f_e = -1 \sim -1.5$; and $-2 < f_3/f_e < 2$.

Parameters of the miniature image capture lens 302 of an example are illustrated below.

Example 2 parameters are as follows:

$f_e = 1.134$ mm;

$L = 1.6$ mm;

$R_1 = 0.546$ mm; $R_2 = 0.829$ mm; $R_3 = 0.929$ mm;

$L/f_1 = 1.41$;

$f_1/f_e = 0.94/1.137 = 0.83$;

$f_2/f_e = -1.6/1.137 = -1.41$; and $f_3/f_e = 1.79/1.137 = 1.57$.

| | Design Curve | | |
|---|---|---|---|
| | 1st Lens | 2nd Lens | 3rd Lens |
| C | 1.8331 | 1.2061 | 1.0762 |
| Thickness | 0.1373 | 0.046 | 0.1945 |
| Clear Aperture | 0.2207 | 0.2525 | 0.4968 |
| K | 1.4174 | −49.3888 | −34.3523 |

-continued

| | Design Curve | | |
|---|---|---|---|
| | 1st Lens | 2nd Lens | 3rd Lens |
| A2 | 0.00000 | 0.00000 | 0.00000 |
| A4 | 0.06432 | 5.07209 | 0.63977 |
| A6 | −51.77604 | −16.11376 | 0.63188 |
| A8 | 684.118558 | 27.76459 | −2.17252 |
| A10 | −3331.32263 | 270.76555 | 0.15176 |

Figure 8A:
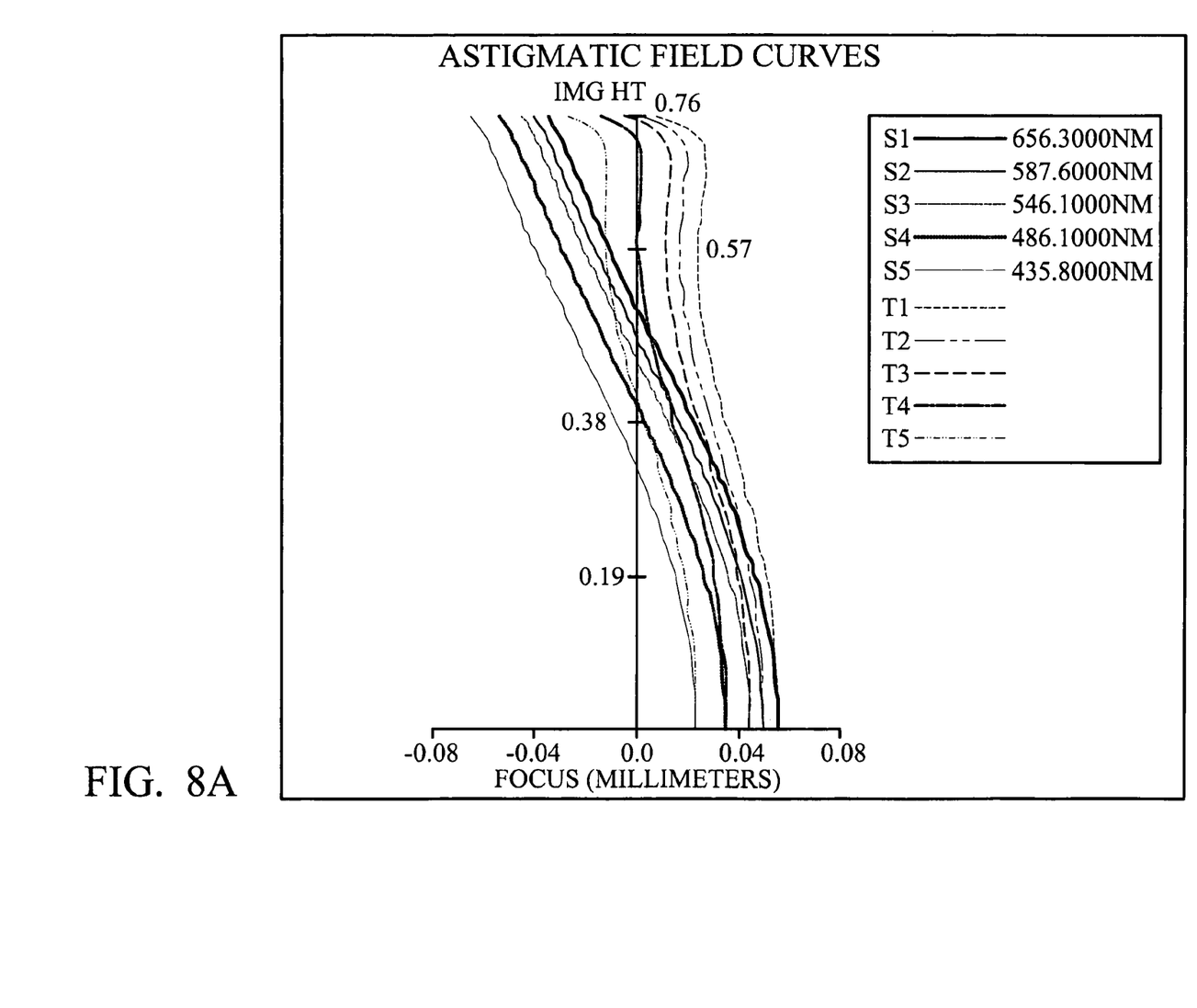
FIG. 8A shows a drawing of astigmatic field curves under various wave length conditions of an example of the invention.
Figure 8B:
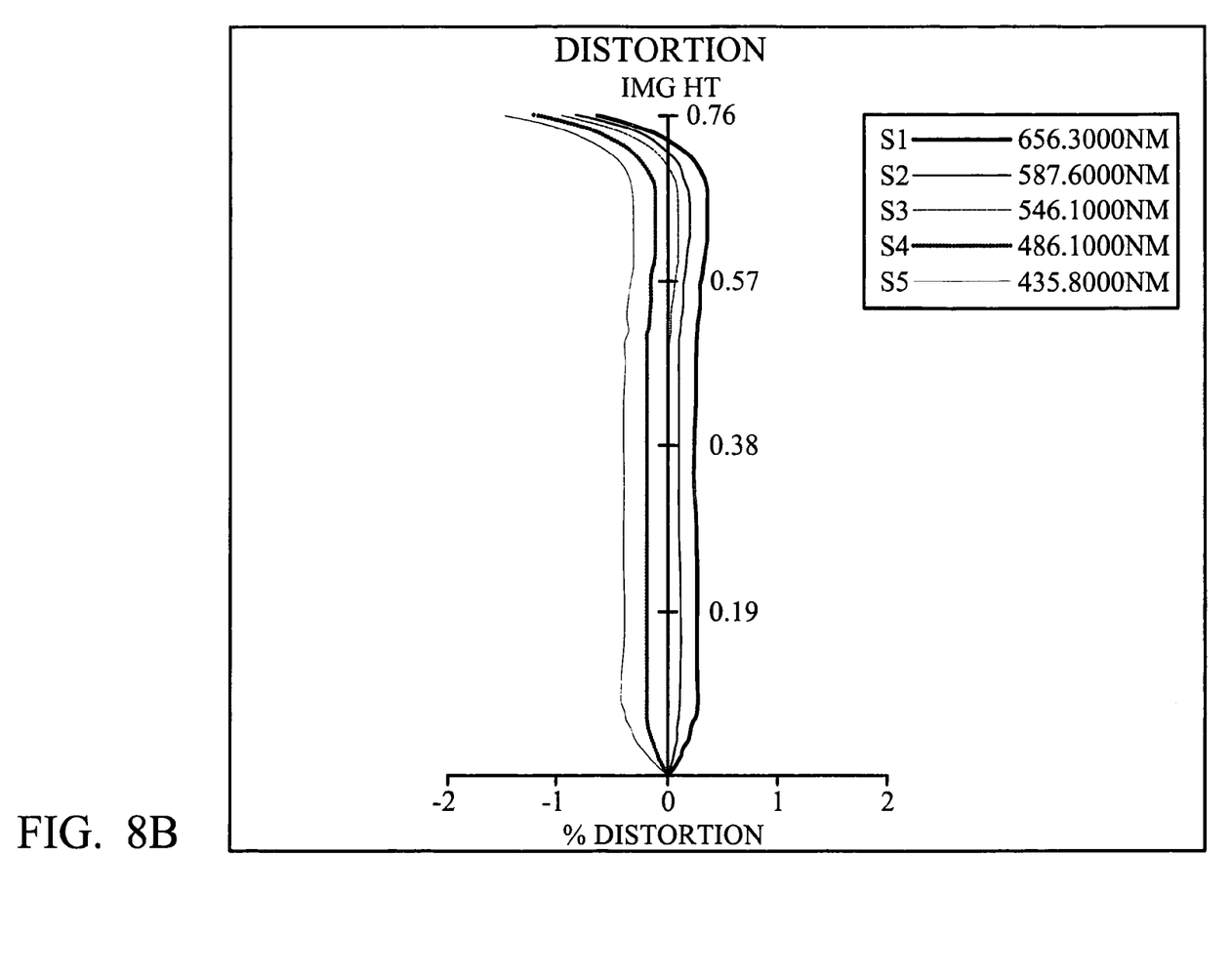
FIG. 8B shows a drawing of distortion curves under various wave length conditions of an example of the invention.
Figure 8C:
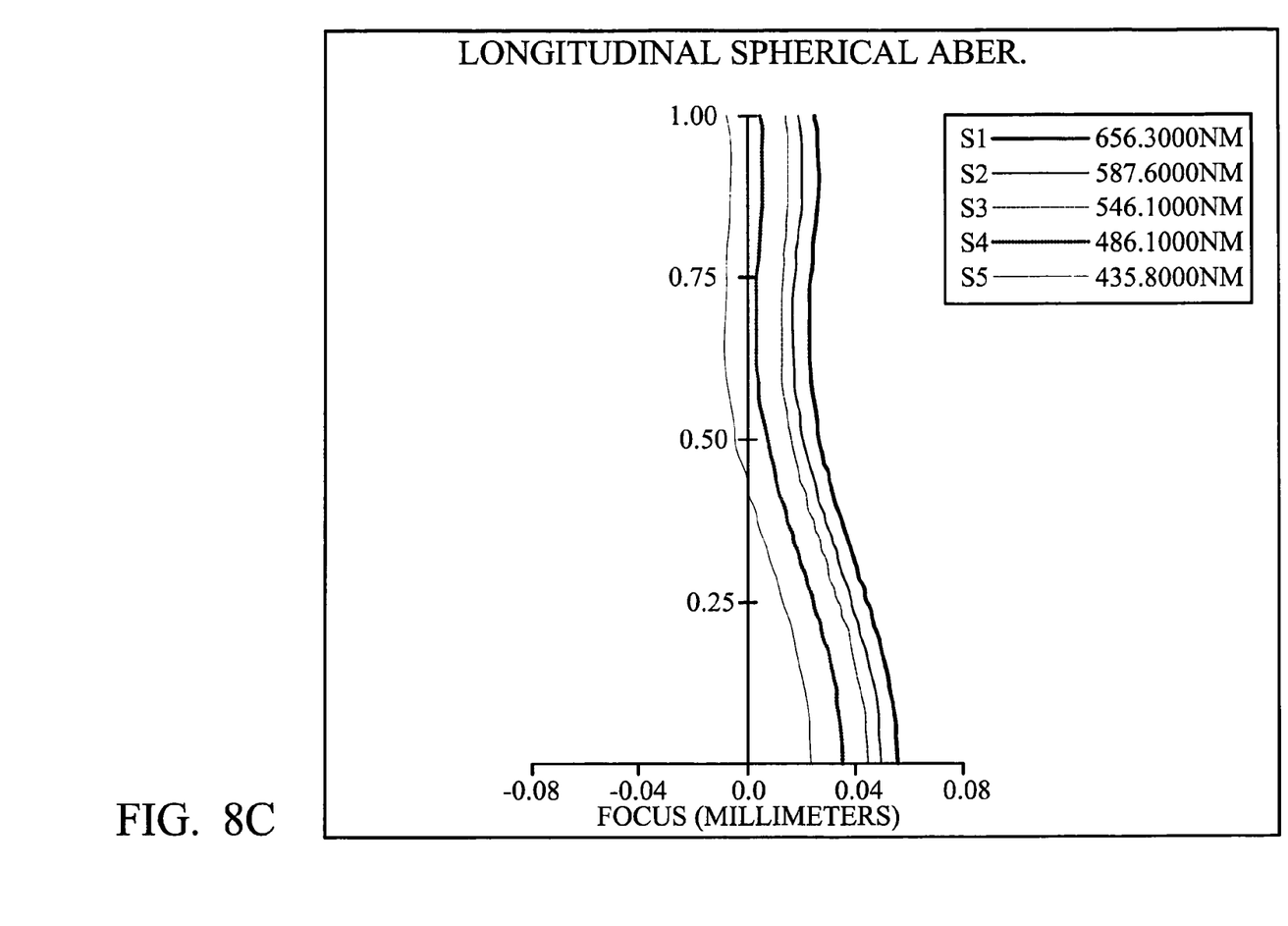
FIG. 8C shows a drawing of a spherical aberration of an example of the invention.
Figure 9:
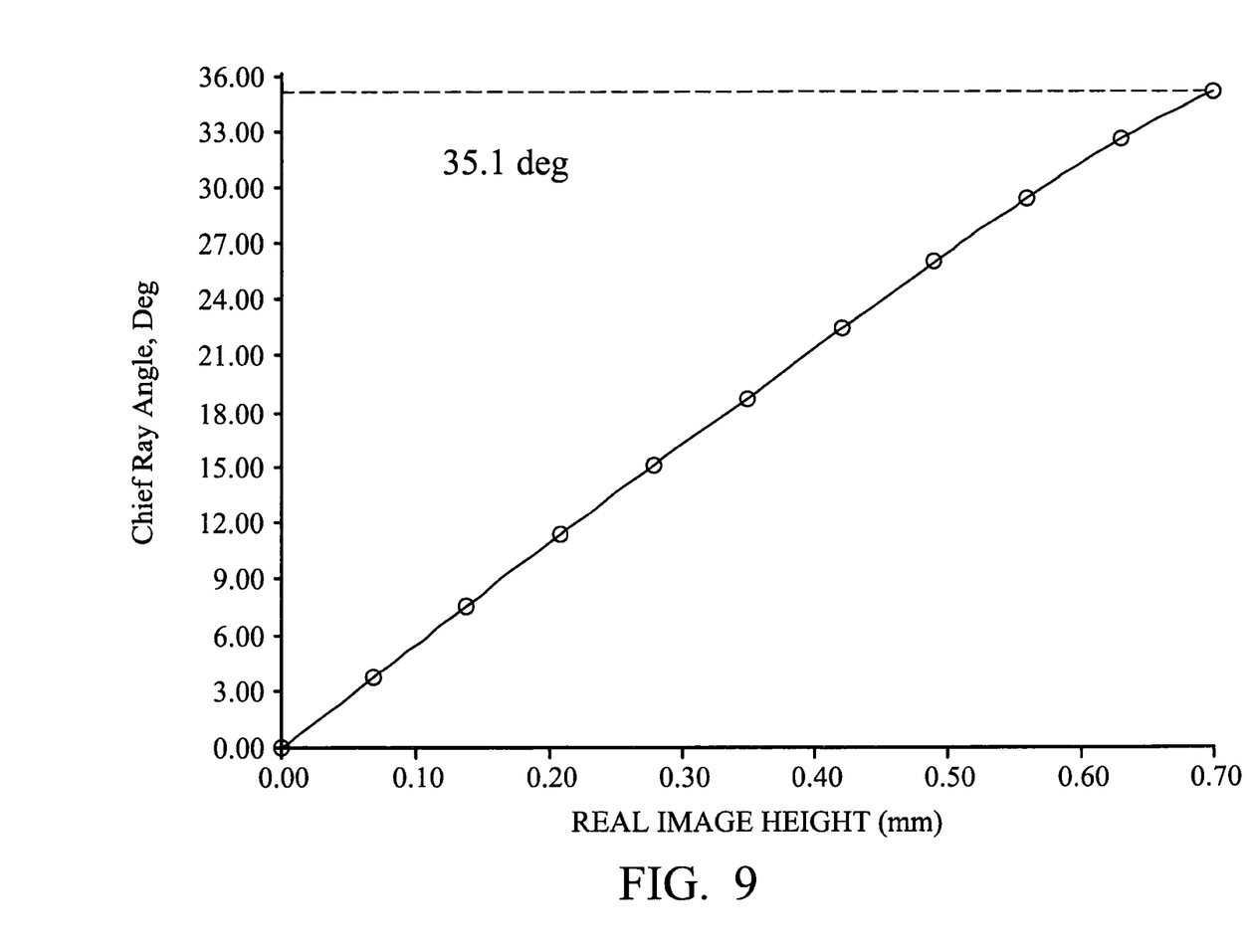
FIG. 9 shows a drawing of a CRA as a function of real image height of an example of the invention.

FIG. 8A shows a drawing of astigmatic field curves under various wave length conditions of the example. FIG. 8B shows a drawing of distortion curves under various wave length conditions of the example. FIG. 8C shows a drawing of a spherical aberration of the example. According to FIG. 8A, FIG. 8B and FIG. 8C, the miniature image capture lens of the embodiment can have good aberration performance. FIG. 9 shows a drawing of a CRA as a function of real image height and a linear performance is obtained.

It is noted that although this specification utilizes the word for lenses, such as first lens, second lens and third lens, the invention is not limited thereto. The invention can also be applied to "surfaces" alternatively and the first lens, the second lens and the third lens can be replaced by the first surface, the second surface and the third surface.

According to the previous descriptions, the invention can provide a wafer-level lens system which has only 3 surfaces and is able to achieve good MTF and an ultra short total track.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A miniature image capture lens, comprising:
an aperture diaphragm having an aperture through which an image is captured; and
a wafer-level lens system, including:
 a first surface disposed on a first substrate;
 a second substrate with a first side bonded to the first substrate;
 a second surface disposed on a second side of the second substrate; and
 a third surface disposed on a third substrate,
 wherein the first surface, the second surface and the third surface are aspherical and the following conditions are satisfied:

$L/f_e < 1.7$;

$f_1/f_e = 0.5 \sim 1.5$;

$f_2/f_e = -1 \sim -1.5$; and $-2 < f_3/f_e < 2$, wherein

L: total track length (TTL) from the first surface to an image plane,
$f_e$: effective focal length of whole lens system,
$f_1$: effective focal length of the first surface,
$f_2$: effective focal length of the second surface, and
$f_3$: effective focal length of the third surface.

2. The miniature image capture lens as claimed in claim 1, wherein the first surface, the second surface and the third surface are lens surfaces.

3. The miniature image capture lens as claimed in claim 1, wherein the first surface is a positive surface.

4. The miniature image capture lens as claimed in claim 3, wherein the second surface is a negative surface.

5. The miniature image capture lens as claimed in claim 4, wherein the third surface is a positive surface.

6. The miniature image capture lens as claimed in claim 1, further comprising a front cover glass over the first surface.

7. The miniature image capture lens as claimed in claim 6, further comprising a UV/IR cut filter formed on the front cover glass.

8. The miniature image capture lens as claimed in claim 1, further comprising a UV/IR cut filter formed on the first surface.

9. The miniature image capture lens as claimed in claim 1, further comprising a back cover glass bonded to the third substrate.

10. The miniature image capture lens as claimed in claim 1, wherein the first surface, the first substrate, the second substrate and the second surface are cemented as a meniscus-like lens.

11. The miniature image capture lens as claimed in claim 1, wherein the third surface is a field corrector correcting a chief ray angle to match an image sensor.

12. The miniature image capture lens as claimed in claim 1, further comprising a spacer between the second surface and the third surface.

13. The miniature image capture lens as claimed in claim 12, wherein the spacer is a frosted glass or black high intensity plastic with at least one drilled hole.

14. The miniature image capture lens as claimed in claim 2, wherein the first substrate, the second substrate and the third substrate is glass plates which match the index of refraction of lens material of the first, second and third surfaces.

15. The miniature image capture lens as claimed in claim 1, wherein each of the first substrate, the second substrate and the third substrate has thickness of about 300 μm~400 μm.

16. A miniature image capture lens, comprising:
an aperture diaphragm having an aperture through which an image is captured; and
a wafer-level lens system, including:
a first surface disposed on a first side of a first substrate;
a second surface disposed a second side of the first substrate; and
a third surface disposed on a second substrate,
wherein the first surface, the second surface and the third surface are aspherical and the following conditions are satisfied:

$L/f_e < 1.7$;

$f_1/f_e = 0.5 \sim 1.5$;

$f_2/f_e = -1 \sim -1.5$; and $-2 < f_3/f_e < 2$, wherein

L: total track length (TTL) from the first surface to an image plane,
$f_e$: effective focal length of whole lens system,
$f_1$: effective focal length of the first surface,
$f_2$: effective focal length of the second surface,
$f_3$: effective focal length of the third surface.

17. The miniature image capture lens as claimed in claim 16, wherein the first surface, the second surface and the third surface are lens surfaces.

18. The miniature image capture lens as claimed in claim 16, wherein the first surface is a positive surface, the second surface is a negative surface and the third surface is a positive surface.

19. The miniature image capture lens as claimed in claim 16, further comprising a UV/IR cut filter formed on a front cover glass over the first surface or on the first surface.

20. The miniature image capture lens as claimed in claim 16, further comprising a spacer between the second surface and the third surface.

* * * * *